United States Patent
Wang et al.

(10) Patent No.: US 11,043,850 B2
(45) Date of Patent: Jun. 22, 2021

(54) CURRENT PHASE LOCKING AND DRIVER PULSE GENERATION METHOD USED IN WIRELESS CHARGING FOR ELECTRIC VEHICLES

(71) Applicant: Xi'an Jiaotong University, Shaanxi (CN)

(72) Inventors: Laili Wang, Shaanxi (CN); Yongbin Jiang, Shaanxi (CN); Ruibang Li, Shaanxi (CN); Yonghui Liu, Shaanxi (CN); Min Wu, Shaanxi (CN); Jing Sun, Shaanxi (CN); Zexian Zeng, Shaanxi (CN); Yue Wang, Shaanxi (CN); Xu Yang, Shaanxi (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 16/729,386

(22) Filed: Dec. 28, 2019

(65) Prior Publication Data

US 2020/0381945 A1 Dec. 3, 2020

(30) Foreign Application Priority Data

May 29, 2019 (CN) .......................... 201910459273.5

(51) Int. Cl.
H02J 50/12 (2016.01)
H02J 50/90 (2016.01)
H04B 5/00 (2006.01)

(52) U.S. Cl.
CPC .............. *H02J 50/12* (2016.02); *H02J 50/90* (2016.02); *H04B 5/0037* (2013.01); *H04B 5/0093* (2013.01)

(58) Field of Classification Search
CPC ......... B60L 53/12; H02J 50/12; H02M 3/337; H02M 3/33569
See application file for complete search history.

(56) References Cited

U.S. PATENT DOCUMENTS

2012/0223592 A1\* 9/2012 Kamata ................... H02J 5/005
307/104

\* cited by examiner

*Primary Examiner* — Rexford N Barnie
*Assistant Examiner* — Elim Ortiz

(57) ABSTRACT

The present invention discloses a current phase locking and driver pulse generation method for wireless charging for electric vehicles. By monitoring the resonant current $i_{L2}$ of the receiving coil, the proposed method generates the synchronization signal accurately based on the phase of the current $i_{L2}$. Moreover, it controls the phases of driver pulses of switching transistors according to the synchronization signal so as to control the turn-on moment and turn-off moment of the switching transistors in the secondary rectifier. As a result, by using the proposed method, the pulse losing of the switching transistors in the secondary active rectifier can be avoided; the stable and reliable phase locking of the high-frequency resonant current and generation of driver pulses can be achieved; the anti-interference capability can be greatly enhanced, and the stability and reliability of the wireless charging system for electric vehicles can also be improved.

2 Claims, 5 Drawing Sheets

CURRENT PHASE LOCKING AND DRIVER PULSE GENERATION METHOD USED IN WIRELESS CHARGING FOR ELECTRIC VEHICLES

CROSS-REFERENCE TO RELATED APPLICATIONS

The application claims the benefit of priority from Chinese Patent Application No. CN201910459273.5, filed on Aug. 21, 2019. The content of the aforementioned application, including any intervening amendments thereto, is incorporated herein by reference in its entirety.

TECHNICAL FIELD

The present invention relates to a current phase locking and driver pulse generation method and in particular a current phase locking and driver pulse generation method used in wireless charging for electric vehicles.

BACKGROUND OF THE PRESENT INVENTION

Depending upon the implementation principle, the wireless power transfer can be classified into near-field wireless power transfer and far-field wireless power transfer. Due to higher efficiency and higher power, the near-field wireless power transfer technique has been widely applied in charging electric vehicles (EVs), intelligent devices, robots, drones, implantable medical devices and the like wirelessly. Particularly in wireless charging for electric vehicles, due to high charging power and strong electromagnetic interference, wireless charging for electric vehicles becomes a research hotspot in the high-power wireless charging applications. In wireless charging for EV's battery packs, it is critical to control the secondary active rectifier. Moreover, the control technique of the active rectifier is vital for improving the transfer efficiency, expanding the operating range and increasing the power density in wireless power transfer systems (WPTSs). A stable and accurate phase-locked method for the secondary resonant current is an indispensable component of the active rectification control technique. In order to control the secondary active rectifier stably, the following requirements need to be satisfied:

1) Stable and Reliable Phase Locking of the High-Frequency Resonant Current

In active rectification, since it is necessary to control the turn-on moment and turn-off moment of the MOSFETs in the secondary active rectifier accurately, it is necessary to lock the phase of the secondary high-frequency resonant current and generate a synchronization signal accurately based on this current phase.

2) Stable and Reliable Generation of Driver Pulses

In order to ensure the normal operation of the secondary active rectifier, it is desired to generate stable trigger pulses to avoid pulse losing so as to control the switching transistor of the secondary active rectifier reliably.

3) Anti-Interference Capability

In wireless charging for EV's battery packs, various strong interferences are unavoidable in WPTSs. During the generation of driver pulses, it is necessary to suppress the interferences effectively so that the generation of driver pulses is safer and more reliable.

In order to control the secondary active rectifier accurately in the wireless charging system for electric vehicles, it is necessary to lock the phase of the secondary high-frequency resonant current in real time, so as to generate a stable synchronization signal to synchronize the driver pulses of the switches. However, due to the dither of the synchronization signal, it is highly possible to lose driver pulses in WPTSs by using the traditional phase synchronization methods based on the DSP controller. In other words, the traditional phase synchronization methods lack anti-interference capability. Therefore, it is unable to lock the current phase accurately and control the driver pulses stably. Therefore, in the wireless charging for electric vehicles, there is no stable and reliable current phase locking and driver pulse generation method to generate driver pulses in the control of the secondary active rectifier.

Therefore, a current phase locking and driver pulse generation method should be proposed to satisfy the three requirements mentioned above simultaneously.

SUMMARY OF THE PRESENT INVENTION

In order to overcome the deficiencies in the prior art, the objective of the present invention is to provide a current phase locking and driver pulse generation method in wireless charging for electric vehicles, which can realize stable and reliable phase locking of the high-frequency resonant current and generation of driver pulses with anti-interference capability.

For this purpose, the current phase locking and driver pulse generation method in wireless charging for electric vehicles provided by the present invention includes driver pulse generation and current phase locking;

the specific process of the driver pulse generation comprises:

sampling the resonant current $i_{L2}$ of the receiving coil in the wireless charging system by a high-frequency current transformer, and sending it to the signal processing unit; by the signal processing unit, converting the current signal from the high-frequency current transformer into a voltage signal with a dc bias, $u_c$, and by a hysteresis comparator, processing the voltage signal it, to obtain the square waveform $i'_{L2}$ in phase with the secondary resonant current $i_{L2}$; inputting the square waveform $i'_{L2}$ into a DSP processor, and using the rising edge of the square waveform $i'_{L2}$ as the synchronization signal $S_{n1}$ of the PWM1 module in the DSP processor to initialize the phase of the counter CNT1 of the PWM1 module; all the counters CNT1, CNT2 and CNT3 operate in the down-count mode; when the counter CNT1 counts to 0, generating the synchronization signal $S_{n2}$ of the PWM2 module in the DSP processor and by the synchronization signal $S_{n2}$, initializing the phase of the counter CNT2 of the PWM2 module; when the counter CNT2 counts to 0, generating the synchronization signal $S_{n3}$ of the PWM3 module in the DSP processor, and by the synchronization signal $S_{n3}$, initializing the phase of the counter CNT3 of the PWM3 module, where the initial values of the counters CNT1, CNT2 and CNT3 are Pha1, Pha2 and Pha3, respectively;

when the counter CNT2 counts to 0, the driver signal $Q_1$ is set to the high level 1 in the PWM2 module, and the driver signal $Q_2$ is set to the low level 0 in the PWM2 module; when the counter CNT2 counts to half of the maximum count value, the driver signal $Q_1$ is set to the low level 0 in the PWM2 module, and the driver signal $Q_2$ is set to the high level 1 in the PWM2 module; when the counter CNT3 counts to 0, the driver signal $Q_3$ is set to the high level 1 in the PWM3 module, and the driver signal $Q_4$ is set to the low level 0 in the PWM3 module; when the counter CNT3 counts to half of the maximum count value, the driver signal $Q_3$ is set to the low level 0 in the PWM3 module, and the driver signal $Q_4$ is set to the high level 1 in the PWM3 module; controlling the upper and the lower switching transistors of the leading leg of the active rectifier by the driver signal $Q_1$ and the driver signal $Q_2$, respectively; controlling the upper and the lower switching transistors of the lagging leg of the active rectifier by the driver signal $Q_3$ and the driver signal $Q_4$, respectively;

the specific process of the current phase locking comprises:

using the square waveform $i'_{L2}$ as the synchronization signal of the PWM1 module; using the $S_{1A}$ generated by the PWM1 module as the reference signal; locking the phase difference between the rising edge of $i'_{L2}$ and the rising edge of $S_{1A}$ by dual D-type flip-flops to generate the phase difference signal $S_{ph}$; capturing the rising and falling edges of the phase difference signal $S_{ph}$ by the CAP module in the DSP processor to obtain the phase value $c\varphi_{cap}$; acquiring the precise phase value of the synchronization signal $S_{n2}$ by the calibration unit, where $\varphi^*_{iref}$ is the reference signal of the phase of $S_{n2}$ and $\varphi_{ifb}$ is the phase feedback signal of $S_{n2}$; based on $\varphi^*_{iref}$ and $yod_b$, calculating the initial value Pha1 of the counter CNT1 by the PID algorithm in the DSP processor; controlling the phase of $S_{1A}$ by adjusting the phase value $\varphi_{C1}$ of the counter CNT1 to control the phase of the synchronization signal $S_{n2}$.

Initial phase values of the counter CNT2 and the counter CNT3 are $\varphi_{C2}$ and $\varphi_{C3}$, respectively, where $$\begin{cases} \varphi_{C2} = (1-D_s)\pi/2 + \Delta\varphi \\ \varphi_{C3} = D_s\pi \end{cases},$$

$\Delta\varphi$ is the phase difference between $S_{n2}$ and the positive zero-crossing point of $i_z$ and $D_s$ is the phase shift duty cycle of the active rectifier. $D_s$ is changed according to the desired charging voltage and charging current to adjust $\varphi_{C2}$ and $\varphi_{C3}$;

the PWM1 module generates the reference signal $S_{1A}$; when the counter CNT1 in the PWM1 module counts to 0 naturally, $S_{1A}$ is set to the high level 1; when the counter CNT1 in the PWM1 module counts to half of the maximum count value naturally, $S_{1A}$ is set to the low level 0; meanwhile, the phase difference $S_{ph}$ between $S_{n1}$ and $S_{n2}$ is obtained by the dual D-type flip-flops; the CAP module in the DSP processor captures the phase difference $S_{ph}$ and acquires the phase value $\varphi_{cap}$ of $S_{ph}$; according to $-\varphi_i=\pi-\varphi_s-\varphi_{cap}$, the phase difference $-\varphi_i$ between the rising edge of $S_{1A}$ and the positive zero-crossing point of $i_z$, can be calculated, where $\varphi_s$ is the hysteresis time-delay angle between the positive zero-crossing point of $i_{L2}$ and the rising edge of $i_{L2}'$. $\varphi_i$ is controlled by the phase-locked loop to adjust the phase of the synchronization signal $S_{n2}$.

The present invention has the following benefits.

During the specific operation of the current phase locking and driver pulse generation method in wireless charging for electric vehicles provided by the present invention, by monitoring the resonant current $i_{L2}$ of the receiving coil, the proposed method generates the synchronization signal accurately based on the phase of the current $i_{L2}$. Moreover, it controls the phases of driver pulses of switching transistors according to the synchronization signal so as to control the turn-on moment and turn-off moment of the switching transistors in the secondary rectifier. As a result, by using the proposed method, the pulse losing of the switching transistors in the secondary active rectifier can be avoided; stable and reliable phase locking of the high-frequency resonant current and generation of driver pulses can be achieved; the anti-interference capability can be greatly enhanced, and the stability and reliability of the wireless charging system for electric vehicles can also be improved.

DETAILED DESCRIPTION OF THE PRESENT INVENTION

The present invention will be further described below in detail with reference to the accompanying diagrams.

The current phase locking and driver pulse generation method in wireless charging for electric vehicles provided by the present invention includes the following steps.

The specific process of the driver pulse generation can be described as follows.

Figure 1:
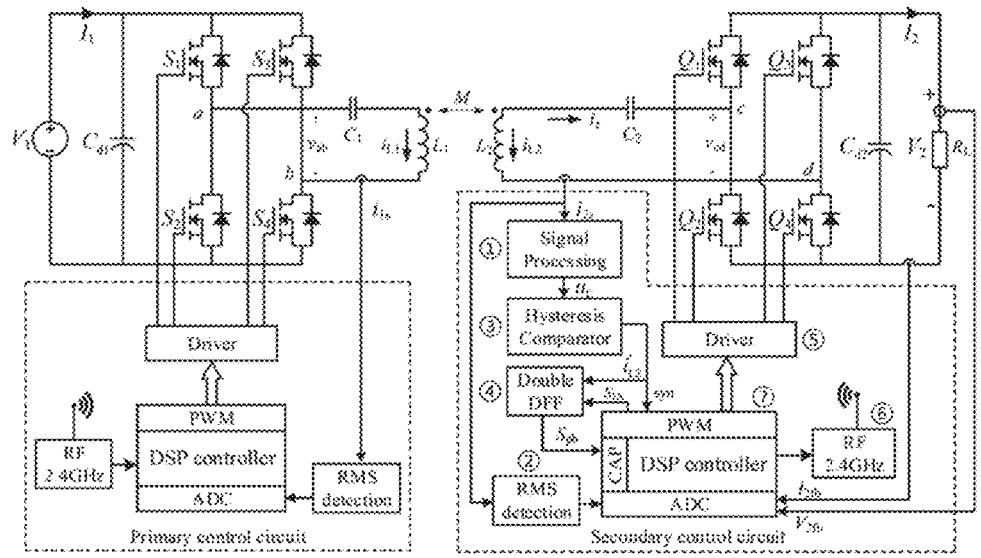
FIG. 1 is the schematic diagram of the phase locking of the secondary resonant current and control method of the system according to the present invention.

Referring to FIG. 1, the resonant current $i_{L2}$ of the receiving coil can be sampled in the wireless charging system by a high-frequency current transformer and then the sampled results will be sent to the signal processing unit. By the signal processing unit, the current signal is converted from the high-frequency current transformer into a voltage signal with a dc bias, $u_c$, and by a hysteresis comparator, the voltage signal $u_c$ is processed to obtain the square waveform $i'_{L2}$ in phase with the secondary resonant current $i_{L2}$. Furthermore, the square waveform $i'_{L2}$ is input into the DSP processor, and the rising edge of the square waveform $i'_{L2}$ is used as the synchronization signal $S_{n1}$ of the PWM1 module in the DSP processor to initialize the phase of the counter CNT1 of the PWM1 module.

Figure 2:
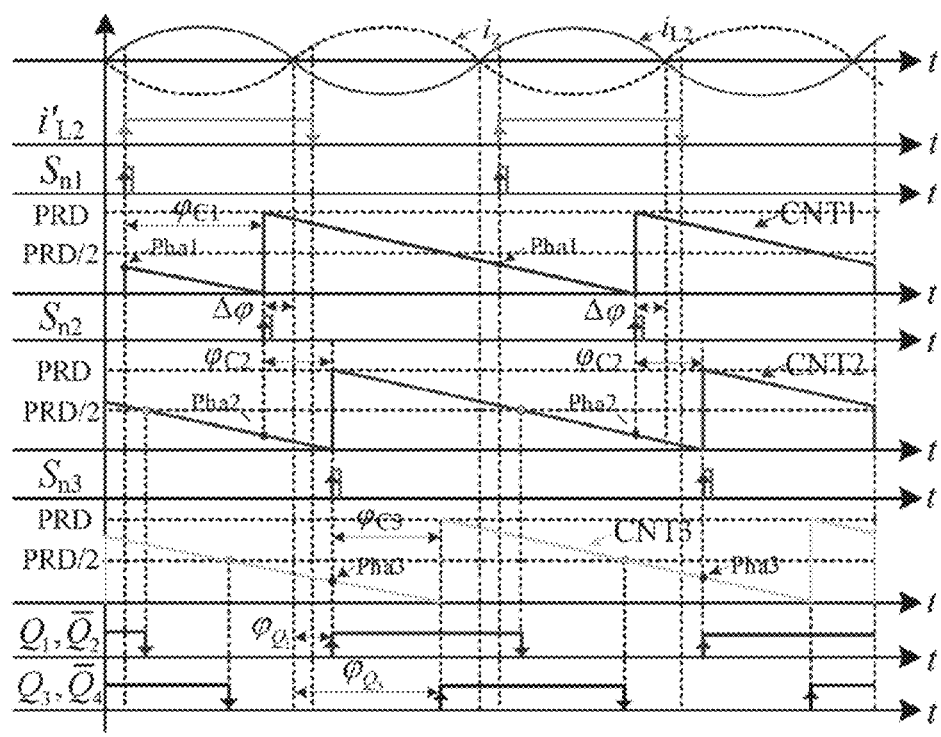
FIG. 2 is the schematic diagram of the driver pulse generation process in the chained trigger mode according to the present invention.

Referring to FIG. 2, all the counters CNT1, CNT2 and CNT3 operate in the down-count mode. When the counter CNT1 counts to 0, the synchronization signal $S_{n2}$ of the PWM2 module is generated in the DSP processor and by the synchronization signal $S_{n2}$, the phase of the counter CNT2 of the PWM2 module is initialized. When the counter CNT2 counts to 0, the synchronization signal $S_{n3}$ of the PWM3 module is generated in the DSP processor, and by the synchronization signal $S_{n3}$, the phase of the counter CNT3 of the PWM3 module is initialized, where the initial values of the counters CNT1, CNT2 and CNT3 are Pha1, Pha2 and Pha3, respectively;

when the counter CNT2 counts to 0, the driver signal $Q_1$ is set to the high level 1 in the PWM2 module, and the driver signal $Q_2$ is set to the low level 0 in the PWM2 module. When the counter CNT2 counts to half of the maximum count value, the driver signal $Q_1$ is set to the low level 0 in the PWM2 module, and the driver signal $Q_2$ is set to the high level 1 in the PWM2 module. When the counter CNT3 counts to 0, the driver signal $Q_3$ is set to the high level 1 in the PWM3 module, and the driver signal $Q_4$ is set to the low level 0 in the PWM3 module. When the counter CNT3 counts to half of the maximum count value, the driver signal $Q_3$ is set to the low level 0 in the PWM3 module, and the driver signal $Q_4$ is set to the high level 1 in the PWM3 module. The upper and the lower switching transistors of the leading leg of the active rectifier are controlled by the driver signal $Q_1$ and the driver signal $Q_2$, respectively, and the upper and the lower switching transistors of the lagging leg of the active rectifier are controlled by the driver signal $Q_3$ and the driver signal $Q_4$, respectively.

The specific process of the current phase locking can be described as follows.

The square waveform $i'_{L2}$ can be used as the synchronization signal of the PWM1 module. The $S_{1A}$ generated by the PWM1 module can be used as the reference signal. The phase difference between the rising edge of $i'_{L2}$ and the rising edge of $S_{1A}$ can be locked by dual D-type flip-flops to generate the phase difference signal $S_{ph}$. The rising and falling edges of the phase difference signal $S_{ph}$ can be captured by the CAP module in the DSP28335 processor to obtain the phase value $\varphi_{cap}$. The precise phase value of the synchronization signal $S_{n2}$ can be acquired by the calibration unit, where $\varphi^*_{ref}$ is the reference signal of the phase of $S_{n2}$ and $\varphi_{ifb}$ is the phase feedback signal of $S_{n2}$. Based on $\varphi^*_{iref}$ and $\varphi_{ifb}$, the initial value Pha1 of the counter CNT1 is calculated by the PID algorithm in the DSP28335 processor. The phase of $S_{1A}$ can be controlled by adjusting the phase value $\varphi_{C1}$ of the counter CNT1 to control the phase of the synchronization signal $S_{n2}$.

Initial phase values of the counter CNT2 and the counter CNT3 are $\varphi_{C2}$ and $\varphi_{C3}$, respectively, where $$\begin{cases} \varphi_{C2} = (1-D_s)\pi/2 + \Delta\varphi \\ \varphi_{C3} = D_s\pi \end{cases},$$

$\Delta\varphi$ is the phase difference between $S_{n2}$ and the positive zero-crossing point of $i_z$ and $D_s$ is the phase shift duty cycle of the active rectifier; $D_s$ is changed according to the desired charging voltage and charging current to adjust $\varphi_{C2}$ and $\varphi_{C3}$.

The PWM1 module generates the reference signal $S_{1A}$. When the counter CNT1 in the PWM1 module counts to 0 naturally, $S_{1A}$ is set to the high level 1. When the counter CNT1 in the PWM1 module counts to half of the maximum count value naturally, $S_{1A}$ is set to the low level 0. Meanwhile, the phase difference $S_{ph}$ between $S_{n1}$ and $S_{n2}$ is obtained by the dual D-type flip-flops. The CAP module in the DSP processor captures the phase difference $S_{ph}$ and acquires the phase value $\varphi_{cap}$ of $S_{ph}$. According to $-\varphi_i=\pi-\varphi_s-\varphi_{cap}$, the phase difference $-\varphi_i$ between the rising edge of $S_{1A}$ and the positive zero-crossing point of $i_z$ can be calculated, where $\varphi_s$ is the hysteresis time-delay angle between the positive zero-crossing point of $i_{L2}$ and the rising edge of $i'_{L2}$. $\varphi_i$ is controlled by the phase-locked loop to adjust the phase of the synchronization signal $S_{n2}$.

Figure 3:
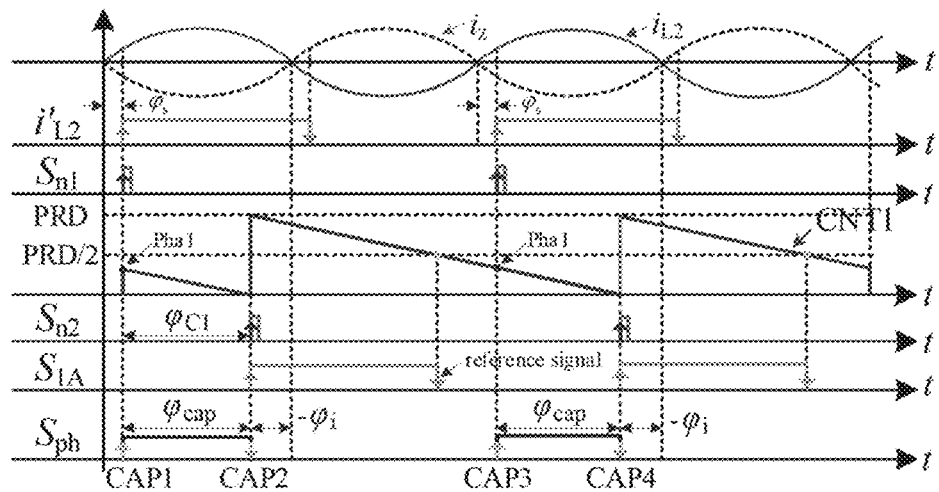
FIG. 3 shows the operating principle of the phase-locked loop according to the present invention.

Referring to FIG. 3, in order to observe and control the phase of $S_{n2}$, the PWM1 module generates the reference signal $S_{1A}$. When the counter CNT1 in the PWM1 module counts to 0 naturally, the reference signal $S_{1A}$ generated by the PWM1 module is the high level 1. When the counter CNT1 counts to PRD/2 naturally, the reference signal $S_{1A}$ generated by the PWM1 module is the low level 0. Meanwhile, the phase difference $S_{ph}$ between $S_{n1}$ and $S_{n2}$ is obtained by the dual D-type flip-flops and used as the input signal, and the phase difference $\varphi_{cap}$ between $S_{n1}$ and $S_{n2}$ is obtained by the CAP module in the DSP, where $-\varphi_i$ can be represented as:

$$-\varphi_i = \pi - \varphi_s - \varphi_{cap} \qquad (2)$$

where $\varphi_s$ is the time-delay angle between the positive zero-crossing point of $i_{L2}$ and the rising edge of $i'_{L2}$. By controlling to, in the phase-locked loop, the phase of the synchronization signal $S_{n2}$ can be adjusted.

Figure 4:
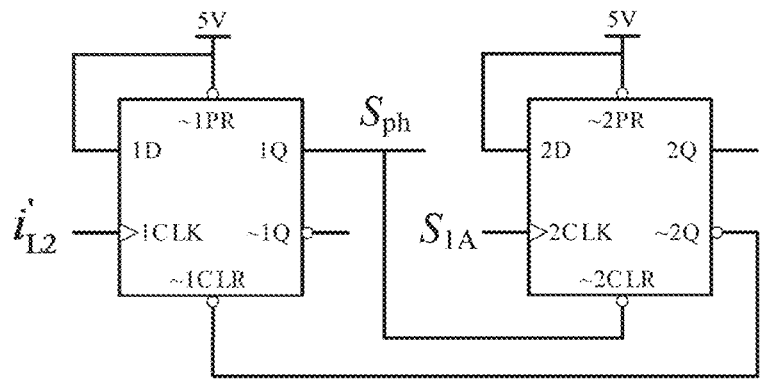
FIG. 4 is the circuit diagram of dual D-type flip-flops of the phase-locked loop according to the present invention.

Referring to FIG. 4, the dual D-type flip-flops consist of two separate D type edge triggered flip-flops, the input signals are $i'_{L2}$ and $S_{1A}$, and the output signal is $S_{ph}$. The output signal has the same frequency as the input signals. The duty cycle represents the phase difference between the two input signals, which is $\varphi_{cap}$ in FIG. 3 in practice.

Figure 5:
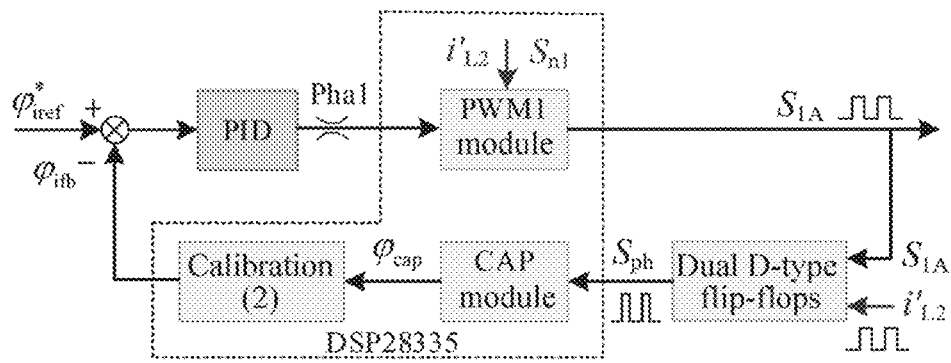
FIG. 5 is the control block diagram of the current phase-locked loop based on DSP28335 according to the present invention.

Referring to FIG. 5, the present invention is used to adjust the phase of the synchronization signal $S_{n2}$. Firstly, the square waveform $i'_{L2}$ can be used as the synchronization signal of the PWM1 module. The $S_{1A}$ generated by the PWM1 module can be used as the reference signal. The phase difference between the rising edge of $i'_{L2}$ and the rising edge of $S_{1A}$ can be locked by dual D-type flip-flops to generate the phase difference signal $S_{ph}$. The rising and falling edges of the phase difference signal $S_{ph}$ can be captured by the CAP module in the DSP28335 processor to obtain the phase value $\varphi_{cap}$. The precise phase value of the synchronization signal $S_{n2}$ can be acquired by the calibration unit with Formula (2), where $\varphi^*_{ref}$ is the reference signal of the phase of $S_{n2}$ and $\varphi_{ifb}$ is the phase feedback signal of $S_{n2}$. Based on $\varphi^*_{iref}$ and $\varphi_{ifb}$, the initial value Pha1 of the counter CNT1 is calculated by the PID algorithm in the DSP28335 processor. The phase of $S_{1A}$ can be controlled by adjusting the phase value $\varphi_{C1}$ of the counter CNT1 to control the phase of the synchronization signal $S_{n2}$.

Figure 6:
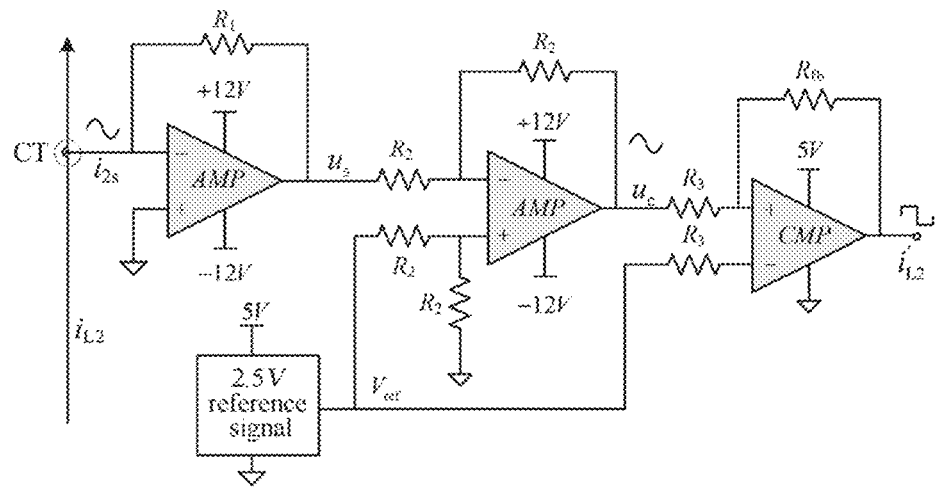
FIG. 6 is the zero-crossing point detection circuit diagram of the secondary resonant current $i_{L2}$ according to the present invention.

Referring to FIG. 6, $i_{2s}$ is the output signal of the current transformer and then converted into the voltage signal $u_s$ by the resistor $R_1$. $u_c$ is obtained by adding the bias of 2.5V to $u_s$. Next, $u_c$ is compared with the reference voltage 2.5V and then the corresponding square waveform $i'_{L2}$ is obtained by the hysteresis comparator.

Figure 7:
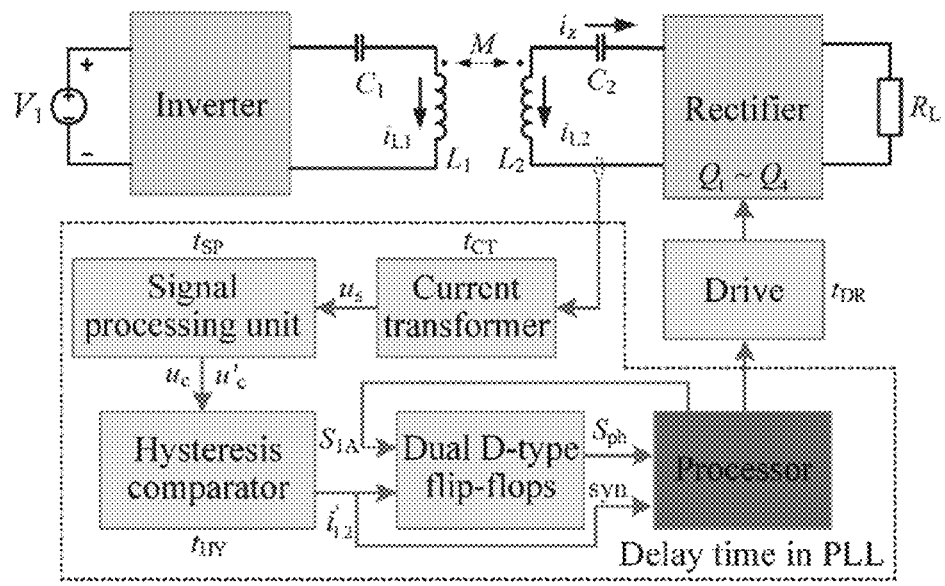
FIG. 7 is the time-delay analytical diagram of the system according to the present invention.

Referring to FIG. 7, the time-delay analysis of the phase-locked loop proposed in the present invention is shown in the dashed box. The delay time of the phase-locked loop mainly includes two parts: the delay time $t_{CT\_SP}$ of the current transformer and the signal processing unit and the delay time $t_{HY}$ of the hysteresis comparator. The delay time $t_{CT\_SP}$ of the current transformer and the signal processing unit is hardly related to the parameters of the hardware circuit, which is approximately constant, and its corresponding phase time-delay angle is $\varphi_{CT\_SP}$. The actual physical meaning of the phase time-delay angle $\varphi_{CT\_SP}$ is the phase difference between the ac component of $u_c$ and $i_{L2}$, where the phase time-delay angle $\varphi_{CT\_SP}$ is:

$$\varphi_{CT\_SP} = t_{CT\_SP} \times f_s \times 2\pi \qquad (3).$$

The delay time $t_{HY}$ of the hysteresis comparator is related to the amplitude and frequency of the resonant current, and its corresponding phase time-delay angle is $\varphi_{HY}$. The actual physical meaning of the delay time $t_{HY}$ is the phase difference between the rising edge of $i'_{L2}$ and the positive zero-crossing point of the ac component $u'_c$ of $u_c$. The delay time for the hysteresis comparator mainly includes two parts: the delay time $t_{hyst}$ determined by the characteristics of the hysteresis comparator itself and related to the amplitude and frequency of the input signal; the delay time $t_{ac}$ which is the action response delay time of the comparator and is determined by the device itself. Since the high-speed comparator is generally used in the practical system, this delay time $t_{ac}$ is approximately constant. Therefore, ply can be calculated as:

$$\varphi_{HY} = \arcsin\left(\frac{N_1 R_3 V_{ref}}{\sqrt{2}\, I_{L2} R_{fb}}\right) + t_{ac} \times f_s \times 2\pi \quad (4)$$

where $N_1$ is the ratio of the effective value of $i_{L2}$ to the effective value of $u'_c$, $I_{L2}$ is the effective value of the signal $i_{L2}$, and $V_{ref}$ is the bias voltage. Therefore, by comprehensively considering all the delay time in the phase-locked loop, the corresponding phase difference is $\varphi_s$, whose actual meaning is the phase difference between the rising edge of $i'_{L2}$ and the positive zero-crossing point of $i_{L2}$. $\varphi_s$ is expressed as:

$$\varphi_s = \varphi_{CT\_SP} + \varphi_{HY} \quad (5)$$

To describe the effectiveness of the present invention, the present invention is experimentally verified by the parameters listed in Table 1.

TABLE 1

| Name | Parameter | Numerical value | Unit |
| --- | --- | --- | --- |
| Primary resonant coil | $L_1$ | 118.43 | μH |
| Primary resonant capacitor | $C_1$ | 29.92 | nF |
| Secondary resonant coil | $L_2$ | 118.55 | μH |
| Secondary resonant capacitor | $C_2$ | 29.88 | nF |
| Coupling coefficient | $k$ | 0.2 | / |
| Load resistor | $R_L$ | 18 | Ω |

Figure 8:
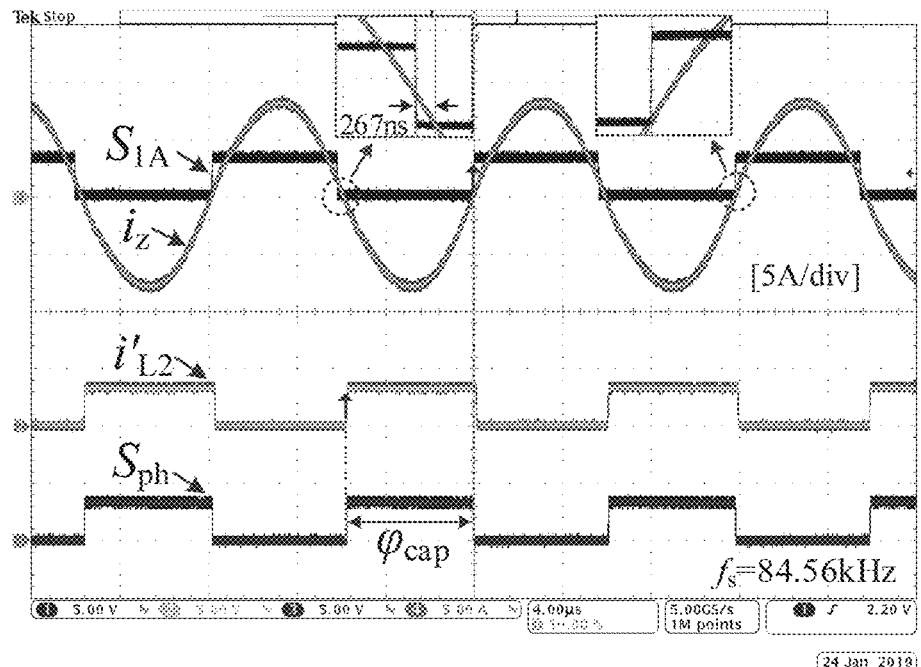
FIG. 8 is the operating waveform diagram of the phase-locked loop with the input dc voltage $V_1$=80V.

Referring to FIG. 8, by the phase locking method proposed in the present invention, the rising edge of $S_{1A}$ is located at the positive zero-crossing point of $i_z$, and the falling edge of $S_{1A}$ leads the negative zero-crossing point of $i_z$ with $t_{DT}$, where $t_{DT}$ is the preset dead time of driver pulses. With the calibration unit shown in Formula (2), when the amplitude of the resonant current is changed, the rising edge of the reference signal $S_{1A}$ always tracks the positive zero-crossing point of $i_z$, and the falling edge of $S_{1A}$ leads the negative zero-crossing point of $i_z$ with 267 ns, i.e., $t_{DT}$.

Figure 9:
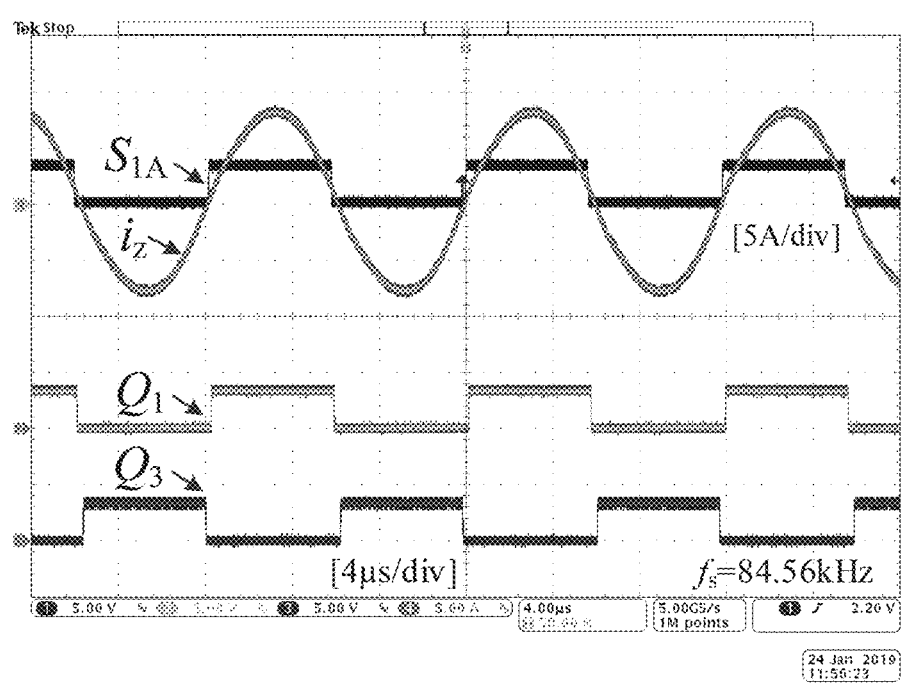
FIG. 9 is the operating waveform diagram of the driver signals with the input dc voltage $V_1$=80V and the phase shift duty cycle $D_s$=1.

Referring to FIG. 9, taking the synchronous rectification as an example, with the method proposed in the present invention, the driver signals $Q_1$ and $Q_3$ are generated, and the positive zero-crossing point of $i_z$ is exactly located at the middle point of the dead band, which is set to 267 ns.

Figure 10A:
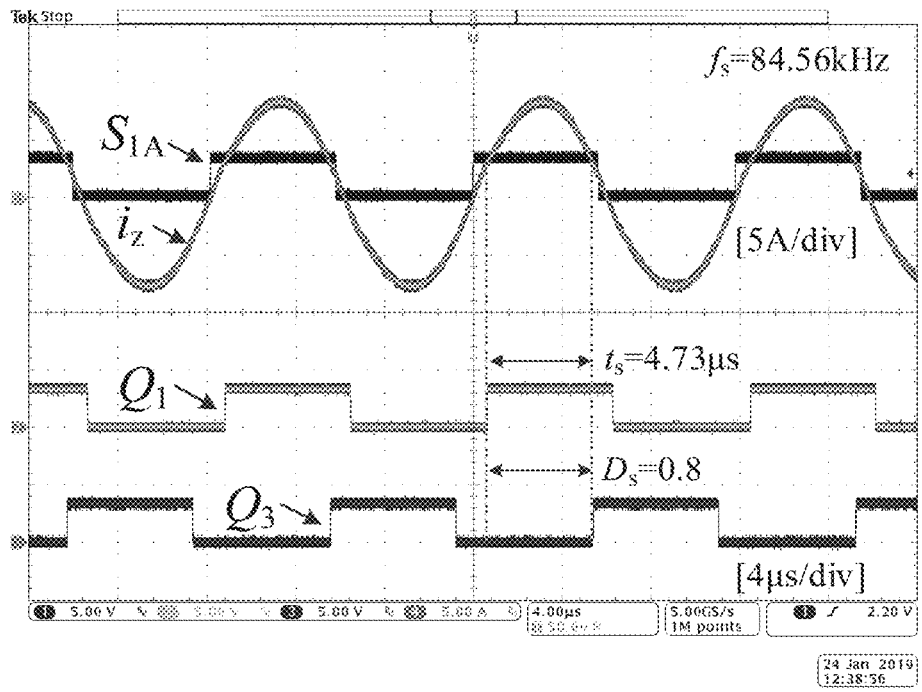
FIG. 10a is the operating waveform diagram of the driver signals with the input dc voltage $V_1$=80V and the phase shift duty cycle $D_s$=0.8.
Figure 10B:
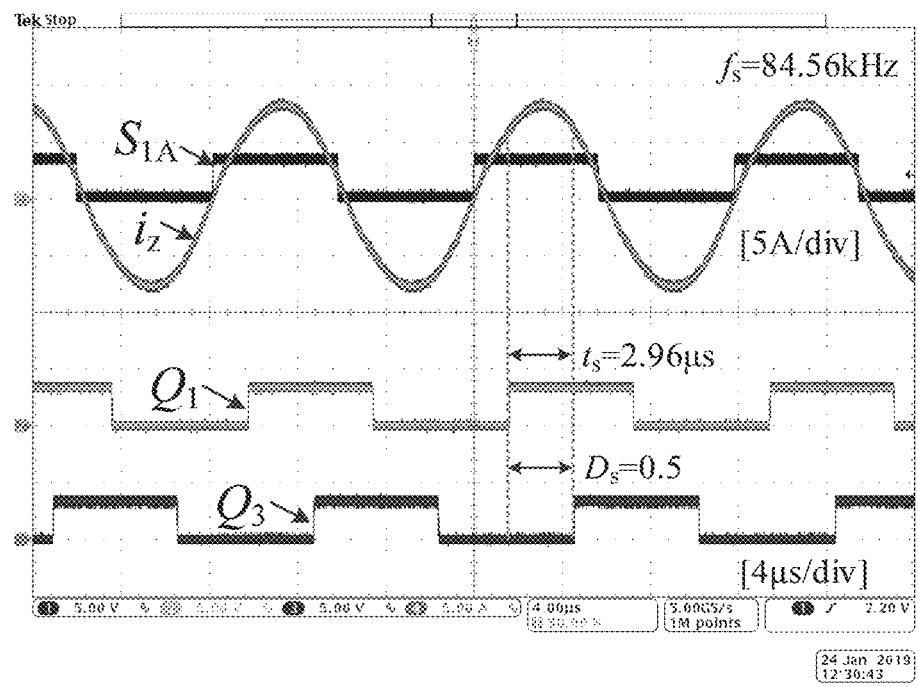
FIG. 10b is the operating waveform diagram of the driver signals with the input dc voltage $V_1$=80V and the phase shift duty cycle $D_s$=0.5.

Referring to FIGS. 10a-b, with the method proposed in the present invention, the phase of the driver pulses can be accurately controlled when the duty cycle $D_s$ of the active rectifier is changed.

In conclusion, with the method proposed in the present invention, the accurate and stable control of the high-frequency active rectifier in the wireless charging system for electric vehicles can be realized. By acquiring the phase of the resonant current by the hysteresis comparator, the disturbance of the current near the zero-crossing point during the wireless charging process of electric vehicles can be effectively suppressed, and the reliability of the current phase locking method can be improved. The phase of the synchronization signal can be controlled accurately by the phase-locked loop, so that the phase of the driver pulses can be controlled accurately. In the chained trigger mode, the problem of the driver pulse losing can be avoided so that the stable and reliable operation of the active rectifier can be guaranteed. Specifically: 1) the accurate phase locking of the secondary high-frequency resonant current can be realized; 2) the driver pulses of the high-frequency rectifier can be stably generated, and the problem of the driver pulse losing can be avoided; 3) by introducing the hysteresis comparison in the current phase-locked loop, the wireless charging system for electric vehicles achieves sufficiently satisfying anti-interference performance.

What is claimed is:

1. A current phase locking and driver pulse generation method used in wireless charging for electric vehicles comprising driver pulse generation and current phase locking;
wherein the driver pulse generation method comprises:
sampling the resonant current $i_{L2}$ of the receiving coil in a wireless charging system by a high-frequency current transformer, and sending it to the signal processing unit; by the signal processing unit, converting a current signal from the high-frequency current transformer into a voltage signal with a dc bias, $u_c$, and by a hysteresis comparator, processing the voltage signal $u_c$ to obtain a square waveform $i'_{L2}$ in phase with the secondary resonant current $i_{L2}$; inputting the square waveform $i'_{L2}$ into a DSP processor, and using a rising edge of the square waveform $i'_{L2}$ as a synchronization signal $S_{n1}$ of a PWM1 module in a DSP processor to initialize the phase of a counter CNT1 of the PWM1 module; all the counters CNT1, CNT2 and CNT3 operate in the down-count mode; when the counter CNT1 counts to 0, generating the synchronization signal $S_{n2}$ of a PWM2 module in the DSP processor and by the synchronization signal $S_{n2}$, initializing the phase of a counter CNT2 of the PWM2 module; when the counter CNT2 counts to 0, generating the synchronization signal $S_{n3}$ of a PWM3 module in the DSP processor, and by the synchronization signal $S_{n3}$, initializing the phase of the counter CNT3 of the PWM3 module, where the initial values of the counters CNT1, CNT2 and CNT3 are Pha1, Pha2 and Pha3, respectively;
when the counter CNT2 counts to 0, a driver signal $Q_1$ is set to the high level 1 in the PWM2 module, and a driver signal $Q_2$ is set to the low level 0 in the PWM2 module; when the counter CNT2 counts to half of the maximum count value, the driver signal $Q_1$ is set to the low level 0 in the PWM2 module, and the driver signal $Q_2$ is set to the high level 1 in the PWM2 module; when the counter CNT3 counts to 0, the driver signal $Q_3$ is set to the high level 1 in the PWM3 module, and the driver signal $Q_4$ is set to the low level 0 in the PWM3 module; when the counter CNT3 counts to half of the maximum count value, the driver signal $Q_3$ is set to the low level 0 in the PWM3 module, and the driver signal $Q_4$ is set to the high level 1 in the PWM3 module; controlling the upper and the lower switching transistors of the leading leg of an active rectifier by the driver signal $Q_1$ and the driver signal $Q_2$, respectively; controlling the upper and the lower switching transistors of the lagging leg of the active rectifier by the driver signal $Q_3$ and the driver signal $Q_4$, respectively;

a phase locking method comprising:

using a square waveform $i'_{L2}$ as the synchronization signal of the PWM1 module; using the $S_{1A}$ generated by the PWM1 module as a reference signal; locking the phase difference between the rising edge of $i'_{L2}$ and the rising edge of $S_{1A}$ by dual D-type flip-flops to generate a phase difference signal $S_{ph}$, capturing the rising and falling edges of the phase difference signal $S_{ph}$ by a CAP module in the DSP processor to obtain a phase value $\varphi_{cap}$; acquiring the precise phase value of the synchronization signal $S_{n2}$ by a calibration unit, where $\varphi^*_{iref}$ is the reference signal of the phase of $S_{n2}$ and $\varphi_{ifb}$ is a phase feedback signal of $S_{n2}$; based on $\varphi^*_{iref}$ and $\varphi_{ifb}$, calculating the initial value Pha1 of the counter CNT1 by PID algorithm in the DSP processor; controlling a phase of $S_{1A}$ by adjusting a phase value $\varphi_{C1}$ of the counter CNT1 to control the phase of the synchronization signal $S_{n2}$.

2. The current phase locking and driver pulse generation method for wireless charging for electric vehicles according to claim 1, where initial phase values of the counter CNT2 and the counter CNT3 are $\varphi_{C2}$ and $\varphi_{C3}$, respectively, where $$\begin{cases} \varphi_{C2} = (1 - D_s)\pi/2 + \Delta\varphi \\ \varphi_{C3} = D_s\pi \end{cases},$$

$\Delta\varphi$ is the phase difference between $S_{n2}$ and a positive zero-crossing point of $i_z$ and $D_s$ is the phase shift duty cycle of the active rectifier; $D_s$ is changed according to a desired charging voltage and charging current to adjust $\varphi_{C2}$ and $\varphi_{C3}$;

the PWM1 module generates the reference signal $S_{1A}$; when the counter CNT1 in the PWM1 module counts to 0 naturally, $S_{1A}$ is set to the high level 1; when the counter CNT1 in the PWM1 module counts to half of the maximum count value naturally, $S_{1A}$ is set to the low level 0; meanwhile, the phase difference $S_{ph}$ between $S_{n1}$ and $S_{n2}$ is obtained by the dual D-type flip-flops; the CAP module in the DSP processor captures the phase difference $S_{ph}$ and acquires the phase value $\varphi_{cap}$ of $S_{ph}$; according to $-\varphi_i=\pi-\varphi_s-\varphi_{cap}$, the phase difference $-\varphi_i$ between the rising edge of $S_{1A}$ and the positive zero-crossing point of $i_z$, can be calculated, where $\varphi_s$ is the hysteresis time-delay angle between the positive zero-crossing point of $i_{L2}$ and the rising edge of $i'_{L2}$, $\varphi_i$ is controlled by the phase-locked loop to adjust the phase of the synchronization signal $S_{n2}$.

* * * * *